United States Patent [19]

Colodney et al.

[11] 3,711,604

[45] Jan. 16, 1973

[54] FLUORIDE CONTAINING TRANSPARENT DENTIFRICE

[75] Inventors: Daniel Colodney, Green Brook; Martin Cordon, Highland Park, both of N.J.

[73] Assignee: Colgate-Palmolive Company, New York, N.Y.

[22] Filed: July 19, 1971

[21] Appl. No.: 164,070

[52] U.S. Cl. .................. 424/52, 424/78, 424/81, 424/83

[51] Int. Cl. .................................................. A61r 7/16
[58] Field of Search ................... 424/52, 78, 81, 83

Primary Examiner—Richard L. Huff
Attorney—Herbert S. Sylvester et al.

[57] ABSTRACT

Transparent dentifrice formulations including a fluorine containing ingredient, preferably stannous fluoride, are disclosed. The fluorine ingredient is incorporated in aesthetically pleasing speckles that are uniformly dispersed throughout the clear dentifrice.

24 Claims, No Drawings

FLUORIDE CONTAINING TRANSPARENT DENTIFRICE

This invention relates to dentifrices. More specifically, the invention relates to visually clear dental cream formulations having improved anti-caries and cleaning properties as well as a unique and aesthetically attractive appearance.

Dental creams that are visually clear i.e. transparent, are attractive to the customer. However, incorporation into formulations of this type of functional ingredients such as polishing agents and fluorine containing compounds, can result in an upsetting of the optical balance and a conversion of the material from transparent to opaque.

In accordance with the present invention, a visually clear dental cream formulation including a fluorine containing component is provided. The fluorine containing component is incorporated into the formulation in the form of aesthetically attractive particles or speckles that are uniformly dispersed in an amount of from about 1 percent to about 5 percent by weight, throughout the dental cream. Advantageously, the dispersed particles or speckles comprise subparticles of a fluorine containing substance having recognized dental value, such as water soluble anti-caries fluoride salts, joined together by a thermoplastic binding resin. Various coloring agents can also be present in the new speckles if desired for aesthetic effect.

The function of a fluorine containing ingredient in a formulation intended for use in the oral cavity is to provide a beneficial effect on the care and hygiene of the teeth by reducing the solubility of enamel tissue in acid environment and to protect the teeth against decay. When incorporated into the visually clear formulations of the invention, the fluoride ingredient must be in a form that does not significantly detract from the clarity of the dentifrice. The primary advantage of the present invention is the incorporation of fluorine ingredients into visually clear dentifrices in the form of aesthetically attractive particles. A further advantage of the invention is the additional incorporation of effective polishing agents in the fluoride containing speckles. The resulting dentifrice in accordance with the invention retains its desirable clear characteristics and includes a fluorine containing ingredient as well as a polishing agent, if desired.

Examples of dentally effective fluorine containing substances include water insoluble anti-caries fluoride salts such as sodium fluoride, stannous fluoride, potassium fluoride, potassium stannous fluoride ($SnF_2$-KF), potassium fluorozirconate, sodium hexafluorostannate, stannous chlorofluoride, and sodium monofluorophosphate. Fluoride compounds that would normally turn a clear gel dentifrice opaque, such as stannous fluoride, can be incorporated into such formulations without any significant loss in effectiveness or transparency, by providing the formulation with fluoride containing speckles, in accordance with the invention.

These materials, which dissociate or release fluorine-containing ions, suitably may be present in an effective but non-toxic amount, usually within the range of about 0.01 to 1 percent by weight of the water-soluble fluorine content thereof. Typically, the amount of fluorine containing substance in the new speckles is between 10 to 30 percent by weight and, of course, depends on the concentration of the speckles in the dental cream. For example to yield 0.1 percent by weight of water-soluble fluoride ions in the final dental cream, with a speckle concentration of about 2 percent by weight, the speckles should comprise about 20 percent by weight of stannous fluoride $SnF_2$.

Suitable thermoplastic binding resins for use in accordance with the invention include the broad class of synthetic and natural resins classifiable as thermoplastic. Representative of this group are ethylenically unsaturated polymers such as polyethylene, polyvinyl chloride, copolymers of polyvinyl chloride and vinyl alcohol, vinyl acetate and vinylidene chloride, polystyrene, polymethylstyrene, synthetic rubbers such as styrene-butadiene copolymers and copolymers of alpha methyl styrene and vinyl toluene; polymethacrylates, such as polymethyl methacrylate, polyethyl methacrylate, polyisopropyl methacrylate, polyisobutyl methacrylate; polyacrylates; polyamides such as nylon; cellulosics such as acetates and butyrates; polycarbonates; phenoxys such as polymers of bis-phenol -A and epichlorohydrin; polymers of monomers containing at least 2 polymerisable groups such as polyallyl methacrylate and the polymers of the di-esters of methacrylic acid and ethylene glycol; coumarone-indene resins, and natural waxes such as carnauba and paraffin, and mixtures of the foregoing resins.

In accordance with a specific aspect of the present invention, advantageous results can be obtained by utilizing a thermoplastic binding resin have a molecular weight between about 1,000 and about 15,000. The hardness, expressed as tenths of mm needle penetration 100 grams/5sec/25°C (ASTMD1321), of preferred resins in the class is typically between about 1 and 15 although harder grades can be used if not objectionable in the final dental cream. The following table lists the properties of thermoplastic binding resins representative of this preferred class.

| Resin | Average molecular weight | Softening point, °C. (approx.) | Hardness | Specific gravity | Average viscosity, cps. |
|---|---|---|---|---|---|
| Polyethylene | 2,000 | 105 | 3.5 | 0.92 | 200 (140° C.) |
| Do | 2,200 | 107 | 3.0 | 0.92 | 220 (140° C.) |
| Do | 3,500 | 116 | 1.0 | 0.93 | 350 (140° C.) |
| Do | 1,500 | 109 | 2.5 | 0.92 | 4,000 (140° C.) |
| Do | 1,500 | 102 | 7.5 | 0.91 | 145 (140° C.) |
| Do | 2,000 | 96 | 9.5 | 0.91 | 230 (140° C.) |
| Do | 3,500 | 95 | 7.0 | 0.92 | 500 (140° C.) |
| Oxidized polyethylene | 1,800 | 104 | 4.0 | 0.94 | 320 (125° C.) |
| Do | 3,000 | 106 | 3.0 | 0.94 | 1,200 (125° C.) |
| Do | 8,000 | 106 | 4.0 | 0.91 | 12,000 (150° C.) |
| Do | 12,000 | 110 | | 0.91 | |
| Polyamide* | 6,000-9,000 | 110 | 3 | 0.98 | 3,800 (150° C.) |
| Do | 6,000-9,000 | 110 | 4 | 0.98 | 2,200 (150° C.) |
| Do | 6,000-9,000 | 95 | 15 | 0.98 | 1,100 (150° C.) |
| Alpha methyl styrene-vinyl toluene copolymer | 1,000 | 100 | | | 3,500 (140° C.) |

*Produced from ethylene diamine in accordance with U.S. Patent Number 2,379,413.

The foregoing resins are non-toxic, tasteless, and do not attack the material from which the packaging tube for the dental cream is constructed (usually aluminum or lead).

Advantageously, the fluorine containing substance is in the form of a fine powder having a preferred mean particle size less than 40 microns, and is uniformly dispersed in the molten thermoplastic resin. After solidification, typically by cooling the thermoplastic fluoride mass is ground to particulate form and screened to isolate the desired size particles. Preferably, the desired size range for the new fluorine containing speckles comprises those particles passing through a 40 mesh screen (U.S. sieve series) and being retained on a 60 mesh (U.S. sieve series) i.e. a mean particle diameter between about 250 and 420 microns.

Alternatively, suitable speckles can be made by agglomerating a mixture of fluoride powder and thermoplastic particles. In accordance with this latter technique a mixture of fluoride powder and thermoplastic particles is heated to slightly below the melting point of the thermoplastic, while being mixed. Heat is applied and the blend is mixed until the thermoplastic resins softens and begins to agglomerate. When the thermoplastic material begins to agglomerate i.e. before it becomes molten, it is removed from the heat source and cooled to a temperature below its softening point while still being mixed. The cooled mass is then ground to particulate form in a suitable apparatus such as a ball or hammer mill. Solid carbon dioxide can be added during the grinding step in order to prevent the temperature of the thermoplastic material from rising above its softening point from the heat generated during grinding. The resulting particulate material is in the form of agglomerates of the fluorine containing substance held together by the thermoplastic binding resin. The desired size particles are then isolated by screening the particulate material through appropriate sieve screens.

As previously mentioned, the new speckles can be colored to contrast with the dental cream base if desired. Preferably, titanium dioxide is included in the speckles to provide white particles that have been found to be very attractive, particularly when incorporated into colored transparent dental cream bases. Titanium dioxide can be present in the speckles in an amount ranging from about 1 to 10 percent by weight, preferably about 5.0 percent by weight. However, any non-toxic dye of a suitable color can be used for this purpose. It is usually desirable to utilize a dye or pigment that is approved for drug and cosmetic use (D&C) or food, drug and cosmetic use (F,D&C).

Representative of suitable dyes for coloring the new speckles are the following: D&C Red numbers 2, 3, 6, 7, 8, 9, 10, 11, 12, 13, 19, 21, 30, 31, 36 and 37, D&C Blue number 1, FD&C Blue numbers 1 and 2, FD&C Red numbers 1, 2 and 3, cosmetic green oxide and cosmetic red oxide. Pigments, known as lakes, of the foregoing dyes are also very suitable for use in coloring the new speckles. A pigment generally defined as a finely powdered insoluble colored material i.e. a dye supported on a carrier, that is dispersed and suspended, as opposed to being dissolved in the medium to be colored.

To be most effective in cleaning the teeth, a polishing agent or abrasive ingredient should be included in the dentifrice formulation. The polishing agent can be incorporated into the gel vehicle of the formulation or, in accordance with the invention, in the speckles. Of course, the polishing agent may be present both in the gel vehicle and the speckles. A preferred polishing agent for incorporation into the gel vehicle of a clear dental cream, is a synthetic amorphous complex aluminosilicate salt of an alkali or alkali earth metal, preferably sodium or calcium in which silica is interbonded with alumina and which contains up to about 3.3 percent by weight of alumina and in which the mole ratio of silica to alumina is at least about 45:1. To be visible in the transparent dental creams, the polishing agent should have a refractive index from about 1.44 to about 1.47. The polishing agent can contain up to about 20 percent by weight moisture and up to about 10 percent by weight of alkali metal or alkaline earth metal oxide. Mean particle size for the polishing agent can be up to about 40 microns, preferably 0.01 to 20 microns. Of course, other abrasive agents having an appropriate refractive index and size, including amorphous colloidal silica such as the xerogels e.g. Syloid 63, 72 and 74 as supplied by the Grace Davison Chemical Co., may be incorporated into the gel vehicle of the formulation.

In further accordance with the invention up to about 80 percent by weight of a polishing agent can be incorporated in the new speckles. In this regard, hard abrasive materials having a mean diameter between about 0.1 and 10 microns may be used instead of the typical sort dental abrasives such as calcium carbonate and dicalcium phosphate. Hard abrasive materials, as contemplated herein include those inorganic, mineral-like substances that are well known for their abrasive properties and have been used for many years as industrial polishing agents. Such materials are characterized by a hardness on the Mohs scale of between about 2 and about 10 (the maximum value), preferably greater than 5. For use in the dental formulations of the invention suitable hard abrasive particles should preferably have a particle size between about 0.1 and 10 microns although larger particles could be used successfully. Representative of these materials are zirconium silicate ($ZrSiO4$), silica (sand, quartz) ground glass (calcium silicate), silicon carbide (grit), pumice, alumina, ilmenite ($FeTiO_3$), $CeO_2$, $Fe_2O_3$ (hematite), $SnO_2$, Topaz (aluminum hydroxy fluoro silicate), and $TiO_2$. Any of the many other mineral substances, such as hard silicate minerals, found in nature or manufactured, which have the foregoing specified hardness and particle size requirements, can be used in accordance with the invention. However, zirconium silicate is preferred.

The preparation of hard abrasive particles suitable for use in accordance with the invention can be accomplished by conventional techniques well known in the art. For example, the preferred zirconium silicate ore by a ball milling technique in which a cylindrical or conical shell rotates on a horizontal axis which is charged with a grinding medium such as balls of steel, flint, or porcelain. The grinding is accomplished by the tumbling action of the balls on the material to be ground. Particles of zirconium silicate which are ball milled have relatively smooth surfaces and good cleaning and polishing action. The desired size particles can be isolated by conventional screening techniques.

Zirconium silicate, and other hard abrasive particles, may also be prepared by hammer milling. Hammer mills utilize a high speed rotary shaft having a plurality of hammers or beaters mounted thereon. The hammers may be T-shaped elements, bars, or rings fixed or pivoted in a housing containing grinding plates or liners. The grinding action results from the impact between the material being milled and the moving hammers. When zirconium silicate is milled by an attrition technique such as hammer milling, relatively rough, jagged particles are produced which have good cleaning and polishing action. Mixtures of ball and hammer milled zirconium silicate may also be advantageously incorporated into the speckles of the invention.

The gel or liquid vehicle of the dentifrice preferably forms a mass of a consistency which desirably can be extruded from a collapsible tube such as an aluminum tube or a lead tube. The vehicle contains liquid and solid. In general, the liquid portion comprises water, glycerine, sorbitol and the like, including suitable mixtures thereof. It is usually advantageous to use a mixture of both water and a humectant such as glycerine, sorbitol or the like. The total liquid content is generally about 20–94.5% by weight of the visually clear dentifrice, and typically includes about 0–30% by weight of water, O-about 80% by weight of glycerine, and about 20–80% by weight of sorbitol. Preferably about 0–15% by weight of water, about 15–35% by weight of glycerine and about 30–50% by weight of sorbitol are present in the dentifrice.

In the liquid portion of the vehicle, sorbitol is suitably employed as a 70 percent by weight aqueous solution which has a refractive index of 1.45. Glycerine alone or admixed with the sorbitol solution can also be used since glycerine has a refractive index of 1.47. Thus, an aqueous mixture of sorbitol and a substantial amount of glycerine is eminently satisfactory.

The solid portion of the vehicle is a gelling agent, such as the natural and synthetic gums and gum-like materials, such as Irish Moss, gum tragacanth, alkali metal carboxymethyl cellulose and hydroxyethyl carboxymethyl cellulose, polyvinyl pyrrolidone, starch, water soluble hydrophilic colloidal carboxyvinyl, polymers, such as those sold under the trademark Carbopol 934 and 940 and synthetic inorganic silicated clays such as those sold under the trademark Laponite CP and Laponite SP. These grades of Laponite have the formula $[Si_8Mg_{5.1}Li_{0.6}H_{7.6}O_{24}]^{0.6-}Na^+_{0.6}$ The solid portion of the vehicle is typically present in an amount up to about 10 percent by weight of the dentifrice and preferably about 0.5–5 percent by weight. When employed, grades of Laponite are preferably used in amounts of about 1–5 percent by weight.

Organic surface-active agents may be used in the compositions of the present invention to achieve increased prophylactic action, assist in achieving thorough and complete dispersion of the instant compositions throughout the oral cavity, and render the instant compositions more cosmetically acceptable. The organic surface-active material may be anionic, nonionic, ampholytic, or cationic in nature, and it is preferred to employ as the surface-active agent a detersive material which imparts to the composition detersive and foaming properties. Suitable types of such detergents are water-soluble salts of higher fatty acid monoglyceride monosulfates, such as the sodium salt of the monosulfated monoglyceride of hydrogenated coconut oil fatty acids, higher alkyl sulfates, such as sodium lauryl sulfate, alkyl aryl sulfonates, such as sodium dodecyl benzene sulfonate, olefin sulfonates, such as sodium olefin sulfonate in which the olefin group contains 12–21 carbon atoms, higher alkyl sulfoacetates, higher fatty acid ester of 1,2-dihydroxy propane sulfonates, and the substantially saturated higher aliphatic acyl amides of lower aliphatic amino carboxylic acid compounds, such as those having 12–16 carbons in the fatty acid, alkyl or acyl radicals, and the like. Examples of the last mentioned amides are N-lauroyl sarcosine, and the sodium, potassium, and ethanolamine salts of N-lauroyl, N-myristoyl or N-palmitoyl sarcosine, which should be substantially free from soap or similar higher fatty acid material which tends to substantially reduce the effect of these compounds. The use of these sarcosine compounds in dentifrice compositions of the present invention is particularly advantageous since these materials exhibit a prolonged and marked effect in the inhibition of acid formation in the oral cavity due to carbohydrate breakdown in addition or exerting some reduction in the solubility of tooth enamel in acid solutions.

Other particularly suitable surface-active materials include nonionic agents such as condensates of sorbitan monostearate with approximately 60 moles of ethylene oxide, condensates of ethylene oxide with propylene oxide condensates of propylene glycol ("Pluronics") and amphoteric agents such as quaternized imidazole derivatives, which are available under the trademark "Miranol" such as Miranol $C_2M$. Cationic surface active germicides and antibacterial compounds such as di-isobutylphenoxyethoxyethyl dimethyl benzyl ammonium chloride, benzyl dimethyl stearyl ammonium chloride, tertiary amines having one fatty alkyl group (of from 12–18 carbon atoms) and two (poly) oxyethylene groups attached to the nitrogen (typically containing a total of from about 2 to 50 ethanoxy groups per molecule) and salts thereof with acids, and compounds of the structure

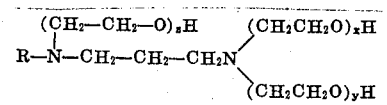

where R is a fatty alkyl group containing from about 12 to 18 carbon atoms, and $x$, $y$ and $z$ total 3 or higher, as well as salts thereof with mineral or organic acids, may also be used. It is preferred to use from about 0.05 to 5 percent by weight of the foregoing surface-active materials in the instant oral preparations.

Any suitable flavoring or sweetening materials may be employed in formulating a flavor for the compositions of the present invention. Examples of suitable flavoring constituents include the flavoring oils, e.g., oils of spearmint, peppermint, wintergreen, sassafras, clove, sage eucalyptus, marjoram, cinnamon, lemon and orange, as well as sodium methylsalicylate. Suitably sweetening agents include sucrose, lactose, maltose, sorbitol, sodium cyclamate, perillartine and saccharine. Suitably, flavor and sweetening agents may together comprise about 0.01 to 5 percent or more of the compositions of the instant invention. Chloroform may also be used.

Various other materials may be incorporated in the oral preparations of this invention. Examples thereof are coloring agents or dyestuffs, preservatives, silicones, chlorophyll compounds, ammoniated materials such as urea, diammoniumphosphate and mixtures thereof, and other constituents.

Antibacterial agents may also be employed in the oral preparations of the instant invention in an amount of about 0.1–5 percent by weight. Typical antibacterial agents include $N^1$-(4-chlorobenzyl)-$N^5$-(2,4-dichlorobenzyl) biguanide;
p-chlorophenyl biguanide;
4-chlorobenzhydryl biguanide;
4-chlorobenzhydrylguanylurea;
N-3-lauroxypropyl-N-p-chlorobenzylbiguanide;
1,6-di-p-chlorophenylbiguanidohexane;
1,6-bis-(2-ethylhexylbiguanido)hexane;
1-(lauryldimethylammonium)-8-(p-chlorobenzyl-dimethylammonium) octane dichloride;
5,6-dichloro-2-guanidinobenzimidazole;
$N^1$-p-chlorophenyl-$N^5$-laurylbiguanide;
5-amino-1,3-bis(2-ethylhexyl)-5-methylhexahydro pyrimidine;

and their non-toxic acid addition salts.

Trademarks finely divided silicas such as those sold under the Trademarks Cab-o-Sil M-5, Syloid 244, Syloid 266 and Aerosil D200 and mixtures thereof may also be employed in amounts of about 0.5–20 percent by weight to promote thickening or gelling of the dentifrice.

In the manufacture of dentifrices, it is conventional to remove entrained air from the product by deaeration under vacuum typically at a late stage in the manufacture. In an aspect of the instant invention, it has been observed that in clear dentifrice gels of suitable viscosity, the dispersed, immobile air bubbles desirably enhance the appearance of the dentifrice and, can therefore, be permitted to remain. Furthermore, air can be at least partially removed and reintroduced in small substantially globular or spheroidal bubbles of say about 0.1–8mm in size, well distributed in the gel at an average of at least about one per cubic centimeter. Such air bubbles may be placed in the gel by stirring it while introducing the air. Instead of air, bubbles of another gas, such as nitrogen or carbon dioxide, can be introduced in non-toxic quantity. In particular, carbon dioxide can provide an effervescent character to the dentifrice.

In the event it is desired to have a minimum amount of air in the dentifrice, or only to have to remove a minimum amount of air from the dentifrice of the instant invention, the "Unimix" apparatus described in "Process Engineering" Sept. 11, 1970, pages 81–85, is particularly efficacious for this purpose. In this apparatus a mixing tool can be rotated in clockwise or counter-clockwise manner, and the action of the mixing tool is followed by the action of a scraper blade to ensure that the working surface of the apparatus is scraped clean. Preferably, a plastic such as polytetrafluorethane is used as the scraper since it is compatible with the various ingredients of the dentifrice. The positioning of the mixing tool and the scraper from a raised central column in the apparatus and the further presence of a hydraulically operated vacuum tight lid permits but little air to enter the formulation during processing. Thus, gelling agent and a portion of liquid are blended, then the remaining liquid can be separately blended with the polishing agent and additional components (except for post-added components, such as flavoring oil) in the Unimix, and then the two dispersions blended together in the Unimix apparatus. If desired, the small amount of air can be largely removed under the depressurized conditions in the apparatus. The apparatus can be used to blend ingredients at room temperature, as well as at higher temperatures.

It is desirable to adjust the pH of the dental cream formulations to the range of about 3 to 9 using such acids as citric, acetic, chloropropionic, malonic, formic, fumaric, methoxyacetic, and propionic of salts thereof. Lower pH's than 3 are generally undesirable for oral use. When stannous ions are present, the pH is preferably lower than about 5. The preferred pH range is 3.5 to about 5.0 when stannous ions are present and about 4.5 to about 7.0 in the absence of stannous ions.

The following specific examples are further illustrative of the nature of the present invention but is understood that the invention is not limited thereto. Dental cream formulations are prepared in the usual manner, except as indicated, and all amounts and proportions are by weight except as otherwise indicated.

Example 1

Fluoride containing speckles suitable for incorporation into transparent dental creams can be prepared in accordance with the following procedure.

A preferred thermoplastic resin is a non-emulsifiable grade of polyethylene having the following properties:

| | |
|---|---|
| Molecular weight | approx 1500 |
| Softening Point (ASTM E-28) | 102°C |
| Hardness (0. 1mm) (ASTM D-5) | 7.5 |
| Density g/cc (ASTM D-1505) | 0.91 |
| Viscosity cps. 140°C Brookfield | 145 |

74 parts of the polyethylene material are heated until molten (about 105°C to 110°C) in a suitable vessel having agitator means. 5 parts of a suitable coloring agent, preferably titanium dioxide and 21 parts of stannous fluoride powder is then added to, and thoroughly mixed with, the molten plastic, while the temperature is maintained between about 105°C and 110°C. The molten mixture is then poured onto a roll mill including three internally water cooled rollers spaced 1/32 inch apart, to obtain a film of the polyethylene material. The polyethylene film is cooled to about 50°C during the milling process and is then broken up into chips. The chips are fed to a solid granulator and are ground to particulate form. The solids granulator can be a double roll mill with grooves or a Stokes type granulator with a mesh and rotor. The particular material is then fed to a sifter having a number 40 mesh (U.S. sieve series) screen and a number 60 mesh (U.S. sieve series) screen. The particles retained on the number 40 mesh screen are recycled to the solids granulator for further size reduction and those that pass through the number 60 mesh screen are recycled to the heating-mixing vessel to be remelted. The particles that pass through the 40 mesh screen and are retained on the 60 mesh screen are utilized in the dentifrice formulations of the invention. They are characterized by having an aesthetically pleasing appearance, an irregular physical configuration, and a particle size of from about 250 to about 420 microns.

Example 2

Example 1 is repeated using a mixture comprising 90 percent by weight of an oxidized polyethylene resin having a softening point of about 104°C and an average molecular weight of about 1,800 and about 10 percent of weight of sodium monofluro phosphate powder.

Example 3

Example 1 is repeated using a mixture comprising 70 percent by weight of a polyamide resin having a softening point of 110°C and an average molecular weight of between 6,000 and 9,000 and 30 percent by weight of stannous fluoride powder.

Example 4

Example 1 is repeated using a mixture comprising 75 percent of an alpha methyl styrene-vinyl toluene copolymer resin having a softening point of about 100°C and an average molecular weight of 1,000 and 25 percent by weight of sodium fluoride powder.

Example 5

A transparent dentifrice having the following composition is formulated by the usual techniques and entrained air is removed under vacuum:

| Component | Parts |
| --- | --- |
| Sorbitol (70% solution) | 45 |
| Glycerine | 25 |
| Sodium carboxymethyl-cellulose | 0.7 |
| Syloid 244 | 5 |
| Sodium aluminosilicate | 16 |
| Sodium lauryl sulfate | 2 |
| Sodium benzoate | 0.5 |
| Sodium saccharine | 0.2 |
| Color | 0.2 |
| Flavor and chloroform | 2 |
| Water | 3 |

The sodium aluminumsilicate employed is a complex having a refractive index of 1.46, a moisture content of about 6 percent, an average particulate size of about 35 millimicrons and a sieve loose bulk density of about 0.12 g/cc.

2 parts of fluoride containing speckles, produced in accordance with example 1 are uniformly dispersed in the foregoing formulation. The resulting dentifrice has a very attractive appearance and a fluoride ion content of 0.10 percent by weight. Aging tests for a 6 week period show that this formulation is cosmetically stable and suffers no loss in transparency.

Example 6

The formulation of example 5 is repeated with 5 parts of the fluoride containing speckles of example 2.

Example 7

The formulation of example 5 is repeated with the fluoride containing speckles of example 3.

Example 8

The formulation of example 5 is repeated with 5 parts of the fluoride containing speckles of example 4.

Although sodium aluminosilicate is a preferred abrasive for incorporation into the gel vehicle, examples 5–8 can be repeated with similar results using xerogels such as those available from the Grace Davison Chemical Co. under the trademark Syloid 63, 72 and 74, as the abrasive component.

Example 9

Fluoride containing speckles having an abrasive component and suitable for incorporation into various transparent dental cream formulations are prepared in accordance with the following procedure.

20 parts of a non-emulsifiable grade of polyethylene having the following properties:

| | |
| --- | --- |
| Molecular weight | approx 1500 |
| Softening Point | 102°C |
| Hardness | 7.5 |
| Density g/cc | 0.91 |
| Viscosity cps. 140°C Brookfield | 145 | are dry mixed with 60 parts of zirconium silicate ($ZrSiO_4$) in particulate form having a mean particle diameter of 1 micron, and a Moh hardness of 8, 20 parts of stannous fluoride powder and 1 part of FD&C Red number 2 aluminum lake pigment in a suitable vessel. The vessel containing the dry mix is heated in a suitable heating apparatus. The dry mix is stirred while being heated. When the softening point of the thermoplastic resin is reached and before the resin becomes molten, the vessel is removed from the heating apparatus and cooled while still being stirred. The cooled mass is then ground to particulate form in a blender type apparatus and screened. The friction passing through a 40 mesh screen (U.S. series) and retained by a 60 mesh screen is collected for use in accordance with the invention. The collected agglomerates have a distinctive red color, a mean diameter between about 250 and 420 microns and can be advantageously combined with various transparent dental creams to produce an aesthetically attractive dentifrice having improved polishing characteristics and a water soluble fluoride ion content of about 0.1 percent by weight.

Example 10

Example 9 is repeated using an oxidized polyethylene resin having a softening point of about 104°C and an average molecular weight of about 1,800 as the thermoplastic binding resin.

Example 11

Example 9 is repeated using a polyamide resin having a softening point of 110°C and an average molecular weight of between 6,000 and 9,000 as the thermoplastic binding resin.

Example 12

Example 9 is repeated using an alpha methyl styrene-vinyl toluene copolymer resin having a softening point of about 100°C and an average molecular weight of 1,000 as the thermoplastic binding resin.

Example 13

Example 9 is repeated using natural carnauba wax having a softening point between 81°C and 86°C as the thermoplastic binding resin.

All of the foregoing examples 9–13 produce fluoride containing abrasive suitable for incorporation into a variety of transparent dental cream formulations without impairing the transparency of the dentifrice. Of course, the color of the agglomerates can be varied by using other suitable coloring materials. The degree of abrasiveness of the speckles can be varied by increasing or decreasing the weight ratio of thermoplastic to abrasive and by choosing a harder or softer abrasive material. In this regard, suitable abrasive speckles can be produced using as the abrasive material powdered alumina (mean particle size 6 microns, Moh hardness 8), powdered silica (mean particle size 5 microns), powdered $SnO_2$ (mean particle size 3 microns, Mohs hardness 6), powdered feldspar ($KAlSi_3O_8$, mean particle size 6 microns, Moh hardness 6) milled topaz (mean particle size 8 microns, Moh hardness 8), and ground pyrex glass (mean particle size 10 microns, Moh hardness 7).

Although the foregoing specific examples include preferred and typical formulations, they should not be

We claim:

1. A dental cream formulation comprising
   a. from about 20 to about 70 percent by weight of a liquid phase including water and a humectant agent, and
   b. from about 20 to about 70 percent by weight of a solid phase,
   c. said solid phase including a plurality of macroscopically visible particles,
   d. each of said macroscopically visible particles including a plurality of subparticles of a fluorine containing substance held together by a thermoplastic binding resin having a molecular weight from about 1,000 to about 15,000 and a hardness measured as tenths of a millimeter needles penetration (ASTM D1321) of about 1 to about 15,
   e. said fluorine containing substance being chosen from the group consisting of stannous fluoride, sodium fluoride, potassium fluoride, potassium stannous fluoride, potassium fluorozirconate, sodium hexafluorostannate, stannous chlorofluoride and sodium monofluorophosphate,
   f. said thermoplastic binding resin being chosen from the group consisting of ethylenically unsaturated polymers, polyamide resins, polymethacrylate resins, polyacrylate resins, and polycarbonate resins,
   g. said subparticles comprising from about 10 to about 30 percent by weight of said particles,
   h. said particles being present in said dental cream in an amount resulting in a water-soluble fluoride ion content of from about 0.01 to about 1.0 percent by weight.

2. A dental cream formulation comprising
   a. from about 20 to about 70 percent by weight of a liquid phase including water and a humectant agent and,
   b. from about 20 to about 70 percent by weight of a solid phase,
   c. said solid phase including a plurality of macroscopically visible particles,
   d. each of said macroscopically visible particles including a plurality of subparticles of a fluorine containing sub-stance held together by a thermoplastic binding resin,
   e. said fluorine containing substance being chosen from the group consisting of stannous fluoride, sodium fluoride, potassium stannous fluoride, potassium fluorozirconate, sodium hexafluorostannate, stannous chlorofluoride and sodium monofluoro-phosphate,
   f. said thermoplastic binding resin being chosen from the group consisting of polyethylene resins having a molecular weight of about 1,500 to bout 3,500,
   g. said subparticles comprising from about 10 to about 30 percent by weight of said particles,
   h. said particles being present in said dental cream in an amount resulting in a water-soluble fluoride ion content of from about 0.01 to about 1.0 percent by weight.

3. The dental cream formulation of claim 2, wherein said liquid phase is visually clear and said solid phase includes a dental polishing agent having a refractive index substantially the same as said liquid phase.

4. The dental cream formulation of claim 2, wherein said fluorine containing substance is stannous fluoride.

5. The dental cream formulation of claim 2, wherein said particles comprise from about 1 to about 5 percent by weight of said formulation.

6. The dental cream formulation of claim 2, wherein said thermoplastic binding resin has a hardness, measured as tenths of a millimeter needle penetration (ASTM D1321) from about 1 to about 15.

7. The dental cream formulation of claim 2, wherein said fluorine containing substance is stannous fluoride and comprises approximately 20 percent by weight of said particles.

8. The dental cream formulation of claim 7 wherein,
   a. said particles comprise approximately 2 percent by weight of said dental cream formulation.

9. The dental cream formulation of claim 2, wherein said particles further include up to 80 percent by weight of a water-insoluble dental polishing agent.

10. The dental cream formulation of claim 9, wherein said dental polishing agent has a Moh hardness of about 2 to about 10.

11. The dental cream formulation of claim 10, wherein said dental polishing agent has a mean particle size of about 0.1 to about 10 microns.

12. The dental cream formulation of claim 11, wherein said dental polishing agent is zirconium silicate.

13. A dental cream formulation comprising a dental vehicle having dispersed therein macroscopically visible particles of a water-soluble anticaries fluoride salt joined together by a material chosen from the group consisting of carnauba wax, paraffin wax and thermoplastic binding resins having a molecular weight of about 1000 to about 15,000 and a hardness, expressed as tenth of a millimeter needle penetration (ASTM D1321) of about 1 to about 15, said particles being present in said formulation in an amount resulting in a fluoride ion content of about 0.01 to about 1.0 percent by weight.

14. The cream formulation of claim 13 wherein
   a. said water soluble anti-caries fluoride salt is chosen from the group consisting of stannous fluoride, sodium fluoride, potassium fluoride, potassium stannous fluoride, potassium fluorozirconate, sodium hexafluorostannate, stannous chlorofluoride and sodium monofluorophosphate.

15. The improved dental cream formulation of claim 13 wherein said water soluble anti-caries fluoride salt is stannous fluoride.

16. The improved dental cream formulation of claim 13 wherein the percentage by weight of said water soluble anti-caries fluoride salt in said particles is between about 10 and about 30.

17. The dental cream formulation of claim 13 wherein said thermoplastic binding resin is chosen from the group consisting of ethylenically unsaturated polymers, polyamide resins, polymethacrylate resins, polyacrylate resins, polycarbonate resins.

18. The dental cream formulation of claim 17 wherein said thermoplastic binding resin is a polyethylene resin having a molecular weight between about 1,500 and 3,500.

19. The dental cream of claim 13, wherein said particles comprise from about 1 to about 5 percent by weight of said formulation.

20. The dental cream formulation of claim 13, wherein said dental vehicle is substantially visually clear and includes a dental polishing agent having substantially the same index of refraction as said dental vehicle.

21. The dental cream formulation of claim 20, wherein said polishing agent is a synthetic amorphous complex alumino-silicate salt of an alkali metal or alkaline earth metal in which silica is interbonded with alumina.

22. The dental cream formulation of claim 13, wherein said particles include up to about 80 percent by weight of a dental polishing agent having a Moh hardness of about 2 to about 10.

23. The dental cream formulation of claim 22, wherein said polishing agent is in particulate form having a mean particle size of about 0.1 to about 10 microns.

24. The dental cream formulation of claim 23, wherein said polishing agent is zirconium silicate.

* * * * *

Disclaimer 3,711,604.—*Daniel Colodney*, Green Brook, and *Martin Cordon*, Highland Park, N.J. FLUORIDE CONTAINING TRANSPARENT DENTIFRICE. Patent dated Jan. 16, 1973. Disclaimer filed Feb. 22, 1974, by the assignee, *Colgate-Palmolive Company*.

Hereby enters this disclaimer to claim 21 of said patent.

[*Official Gazette June 25, 1974.*]